United States Patent [19]

Lake et al.

[11] 4,274,749

[45] Jun. 23, 1981

[54] POLYMER DISPERSION DEVICE

[75] Inventors: Robert J. Lake, Pontiac; Kimberly L. Chapman, Rochester, both of Mich.

[73] Assignee: Clow Corporation, Oak Brook, Ill.

[21] Appl. No.: 80,500

[22] Filed: Oct. 1, 1979

[51] Int. Cl.³ .............................. B01F 3/08; B01F 5/04
[52] U.S. Cl. .................................... 366/132; 366/134; 366/140; 366/152; 366/161; 366/173; 366/178; 366/341
[58] Field of Search ............... 366/132, 134, 140, 150, 366/152, 160, 161, 162, 173, 174, 177, 178, 182, 183, 192, 341; 137/896, 897, 898, 93

[56] References Cited

U.S. PATENT DOCUMENTS

| | | | |
|---|---|---|---|
| 789,673 | 5/1905 | Richter | 137/896 X |
| 2,645,463 | 7/1953 | Stearns | 137/896 X |
| 2,692,764 | 10/1954 | Hanson | 366/160 |
| 3,101,902 | 8/1963 | Chamberlain et al. | 137/896 X |
| 3,335,671 | 8/1967 | Schoenecker et al. | 92/99 |
| 3,726,297 | 4/1973 | Heimann et al. | 137/896 X |
| 4,057,223 | 11/1977 | Rosenberger | 366/172 |

FOREIGN PATENT DOCUMENTS

| | | | |
|---|---|---|---|
| 2810 | 2/1956 | Fed. Rep. of Germany | 366/174 |
| 2023862 | 12/1971 | Fed. Rep. of Germany | 366/173 |

*Primary Examiner*—Philip R. Coe
*Attorney, Agent, or Firm*—Fitch, Even, Tabin, Flannery & Welsh

[57] ABSTRACT

A device for dispersing fluid polymeric material in a liquid diluent without degradation of polymer chain length includes a body having a generally T-shaped interior cavity with a pair of opposed inlets and a side outlet. One inlet holds a diluent injection assembly while the other holds a polymer injection assembly. The juxtaposition of the front ends of the injection assemblies within the interior cavity creates a zone where concurrent streams are pre-mixed and an orifice where the pre-mix is immediately subjected to high shear forces; adjusting the relative positions of the injection assemblies changes the size of the orifice. The continuous on-line supply of a polymer dispersion to a point of use incorporates such a dispersing device, a metering pump for supplying polymer and a small detention tank, which ages the dispersion for about a minute before it is delivered to a conduit leading to the point of use.

11 Claims, 4 Drawing Figures

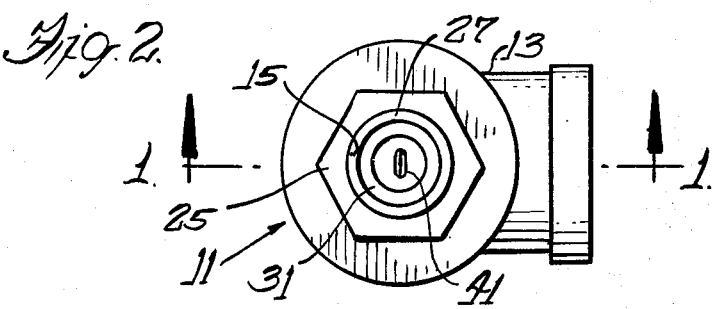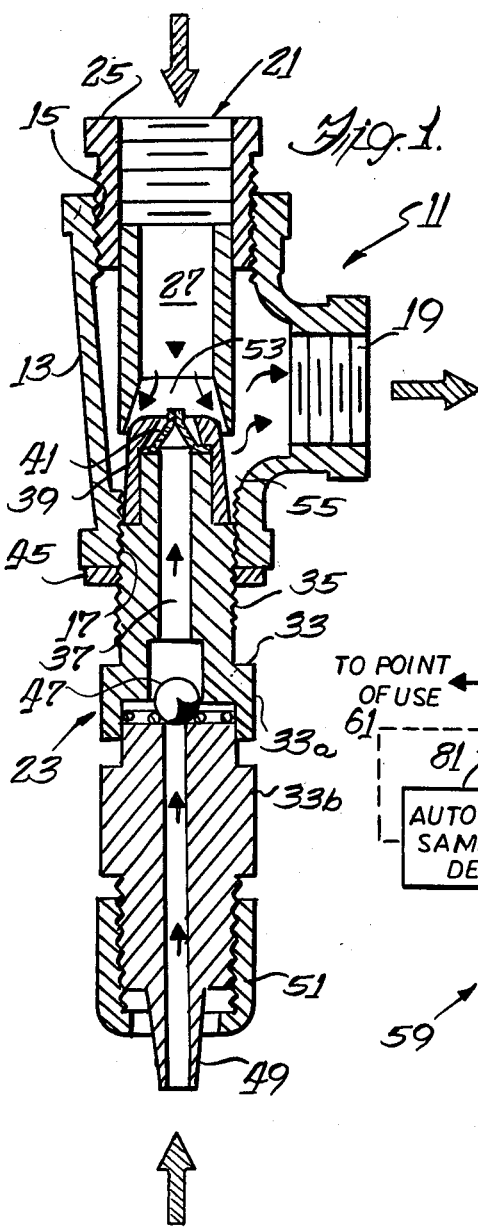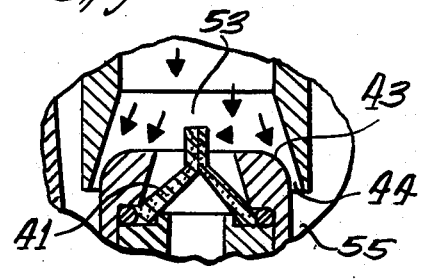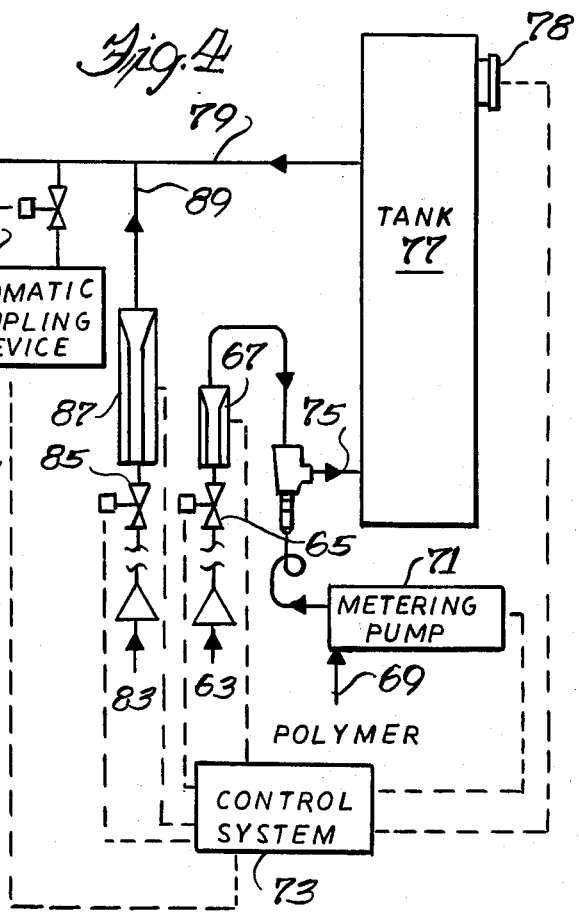

POLYMER DISPERSION DEVICE

The present invention relates to the mixing of a viscous fluid with a diluent liquid, and more particularly to a device for uniformly dispersing a polymeric composition in a relatively large quantity of water.

BACKGROUND OF THE INVENTION

A number of synthetic and some naturally occurring water-soluble polymers have been developed which, in aqueous solution, exhibit excellent thickening and floculating properties. These polymeric materials may be homopolymers, such as polyacrylamide, but are more often copolymers, such as acylamide-acrylic acid, acrylamide-maleic anhydride, acrylamide-styrene, and acrylamide-acrylonitrile. Accordingly, the term "polymeric materials", as used in this application, should be understood to include both polymers and copolymers. In addition to those already mentioned, illustrative polymeric materials may include water-soluble polymers and copolymers of polyvinyl alcohol, polyacrylic acid, polystyrene, sulfonates, diallylamines and derivatives of methacrylates. The molecular weight of such polymeric materials may vary widely, for example, from about 20,000 to over 25,000,000, and it is important to be able to disperse such polymeric materials throughout the diluent liquid, usually water, without substantially degrading the polymer chain length. Generally, the polymeric materials of most concern have a chain length greater than about 500,000. It has become common to distribute such polymeric materials in concentrated form as a part of a water-in-oil emulsion which emulsion must be broken as a part of thoroughly dispersing the polymeric materials in large quantities of water.

Various mixing devices have been developed for dispersing such a viscous water-in-oil emulsion in water. An example of one such device is illustrated in U.S. Pat. No. 4,057,223, issued Nov. 8, 1977. Improved devices for accomplishing this objective are desired.

BRIEF SUMMARY OF THE INVENTION

A relatively simple device has been developed for dispersing a fluid polymeric material into a diluent liquid stream which achieves homogeneous dilution of the polymeric material without degradation of the polymeric structure. The device utilizes a body with a generally T-shaped interior cavity having opposed inlets for the diluent and the polymer and having a side dispersion outlet. Breaking of the emulsion and wetting of the polymeric material occurs as a result of countercurrent injection immediately followed by throttling flow through an adjustable annular orifice. An automatic system incorporating the dispersion device and supply pumps or the like is capable of automatically providing a continuous supply of the homogeneous, aqueous, dilute dispersion to a point of use containing a variable weight percentage of polymer without the need for large mixing and storage tanks.

BRIEF DESCRIPTION OF THE DRAWINGS

FIG. 1 is a vertical sectional view through a dispersion device embodying various features of the invention, taken generally along the line 1—1 of FIG. 2;

FIG. 2 is a top view of the device shown in FIG. 1;

FIG. 3 is a fragmentary view, enlarged in size, showing the dispersion chamber portion of the device of FIG. 1; and FIG. 4 is a diagrammatic view illustrating an overall system utilizing the device of FIG. 1 to provide in-line supply of dilute polymer directly to a point of use.

DETAILED DESCRIPTION OF THE PREFERRED EMBODIMENT

Illustrated in FIGS. 1 through 3 is a dispersion device 11 which includes a main body 13 that has an interior cavity which is generally T-shaped, having a pair of opposed inlets 15 and 17 and a side outlet 19. The inlets and outlets are all internally threaded, and the inlet 15 contains a diluent injection assembly 21 whereas the inlet 17 carries the polymer injection assembly 23. The two injection assemblies are directly opposed to each other so that the fluid streams being injected meet head-on, i.e., countercurrent to each other, and undergo preliminary mixing. In the preferred embodiment, the two assemblies 21,23 are coaxial; however, some deviation from such alignment could be made so long as countercurrent injection is maintained.

The diluent injection assembly 21 includes a threaded adapter 25 which carries a nozzle 27, the rear end of which has exterior threads that mate with the interior threads on the adapter 25. The interior surface of the nozzle 27 at its front end, is formed with an outwardly flaring surface 31. The nozzle 27 is located totally within the chamber that is defined by the interior wall of the main body 13, and it is dimensioned so that it extends into this chamber for a distance well past the center line of the dispersion outlet 19. Preferably, the front edge of the diluent nozzle 27 is located at least three-quarters of the distance across the axial projection of the dispersion outlet opening 19, for a purpose discussed hereinafter.

The injection assembly 23 includes a two-piece injector body 33 which has a cylindrical outer surface 35 which is threaded to match the internal threads on the polymer inlet 17 of the main body. The injector body 33 has a central axial passageway 37 through which the polymeric material is supplied, and its front end is of a narrower diameter and is externally threaded to receive a cap 39 which has interior threads. The cap 39 is used to attach a "duckbill" valve 41 at the front end of the assembly 23.

The duckbill valve 41 is made of a suitable synthetic rubber material and is formed with a circumferential flange that is clamped between the front end of the injector body 33 and the interior wall of the cap 39. The front exterior end 43 of the cap 39 has a rounded, circular, convex, leading edge and is dimensioned so that its diameter is less than the diameter of the flaring surface 31 of the diluent nozzle at its front end and is preferably greater than the diameter at the rear end of the flaring surface 31.

The polymer injection assembly is positioned so that the rounded front end 43 of the nozzle cap is received within the confines of the outward flaring section of the diluent nozzle 27 as depicted in FIG. 1. and as best seen in the enlarged view of FIG. 3. The juxtaposition of the diluent injection nozzle 27 and the polymer injection assembly 21 create a fairly narrow, annular orifice region 44 therebetween. The amount of protrusion of the polymer injector into the diluent nozzle 27 is variable by adjustment of the threaded injector by simply turning the injector body 33. The threaded connection between the exterior threads 35 and the internally threaded inlet 17 effects relative axial movement between the diluent injection nozzle 27 and the rounded cap 39 of the polymer injector. Once located at the desired relative position, the polymer injector is locked in place by a locknut 45 which is threaded to match the external threads on surface 35.

Disposed in the central passageway 37 through the polymer injection assembly is a ball check valve 47 which positively prevents any back flow of diluent into the polymer system. To facilitate incorporation of the check valve 47, the injector body 33 is formed from two pieces 33a and 33b. The rear end of the polymer injector body 33 is provided with a conical receptor 49 for connection to tubing through which the polymer fluid is supplied. For this purpose, the rear end of the body section 33b is also threaded and carries an internally threaded cap 51 which mates therewith and clamps the tubing in tight connection about the conical receptor 49.

When a diluent liquid, usually water, is supplied through the injection assembly 21 and the nozzle 27 and when the polymer fluid (usually a water-in-oil emulsion) is supplied through the polymer injection assembly 23, past the check valve 47 and through the duckbill 41, the two streams meet head-on in the region interior of the flaring surface 31 which serves as a pre-mixing chamber 53. The flow of the fast-moving diluent stream in the injector nozzle is turbulent, and the only exit from the nozzle is through the annular orifice 44. The size of the orifice 44 is set by the adjustment of the polymer injection assembly 23, which acts as an adjustable flow-control valve for the diluent stream in addition to its other functions of creating the pre-mixing region 53 just upstream of assembly 23 and creating the high-shear region 44 at the annular orifice. Movement of the polymer injector toward the diluent injection nozzle 27, so that it protrudes further thereinto, narrows the annular orifice 44 and throttles the flow of diluent therethrough.

The duckbill valve 41 prevents the polymeric material and the diluent from making uncontrolled, premature contact and assures that the polymeric material is in the form of a thin stream exiting from the duckbill when it engages the turbulent countercurrent flow of diluent in the pre-mixing chamber 53 just prior to its passage through the annular orifice 44. At this location of primary contact, relative movement is very active because the already turbulent flow pattern of the diluent is being altered preliminary to its passage through the annular orifice. Immediately after the preliminary mixing has taken place in the chamber 53, the fluid mixture is subjected to maximum shear force at the orifice 44 where a region of laminar flow exists.

Although this period of high shear lasts for an extremely short period of time, not more than a few milliseconds, the employment of this very high shear energy for a very short duration provides the mechanism whereby the polymeric material is excellently wetted. Because of the location of the exit from the diluent injection nozzle 27 well past the centerline of the dispersion outlet 19, the flow of the diluent-polymer mixture must change direction abruptly and nearly reverse itself. Thus a secondary mixing station 55 is created within the main body of the disperser in the region generally surrounding the exterior of the rounded cap 39 of the polymer injector. Final mixing occurs as a result of the high turbulence in the secondary chamber 55 and insures the homogeneity of the dilution. Because of the initial wetting of the polymer which occurred in the high-shear region and the extremely short time duration since initial wetting, there is no degradation of the polymer chain length occurring within this final mixing region of very high turbulence. From this final mixing region 55, the homogeneous dilution exits through the outlet 19.

Depicted in FIG. 4 is an overall schematic diagram of a system 59 for automatically supplying a uniform polymer dilution continuously and directly to a point of use. In this system 59, the polymer dispersing device 11 hereinbefore described is incorporated with other accessories normally employed in such an overall system for the on-line feeding of a polymer dispersion directly to a point of use 61. The primary diluent, usually clean water, is supplied from a suitable source 63 which might include a pump (not shown). The pressure of the diluent might typically be about 35 psig, and the flow of water is regulated by an off-on control valve 65 and measured by a flowmeter 67.

As an example of a representative installation, the interior cavity of a dispersion device 11 may have a diameter of about one inch and an axial length of about two inches; a representative flow rate of water might be about 3 gallons per minute. The valve 65 is a remote-operated, off-on control valve, and the flow rate of the clean water through the device is set by the axial adjustment of the polymer injector assembly 23. Once the desired flow rate is achieved, as read by the flowmeter 67, the injector 23 is locked in position by the locknut 45. The water-in-oil polymer emulsion is fed from a suitable source of supply 69 via a metering pump 71 to the polymer injection assembly. The metering pump 71 can run at a fixed delivery rate, or may be equipped with a device to vary the delivery rate either manually or automatically. The appropriately equipped metering pump 71 may be incorporated into an overall control system 73 which monitors and controls the entire system 59 and which can automatically respond to a change in the requirements at the point of use for a higher or lower weight percentage of polymer.

Mixing and dispersion take place within the dispersion device 11, and the dilution exiting therefrom through a conduit 75 enters the bottom of a surge tank 77. The tank 77 is relatively small and is designed so that the residence time of the dilution within the tank is about one minute; residence times between about 30 seconds and about 2 minutes are generally acceptable. During this minute of relative quiescence, the long chain polymers adapt to their now extremely dilute environment. The tank 77 may be equipped with a high level sensor 78 to send a signal to the control system 73 to halt the supply of polymer and diluent when the level in the tank is indicative that employment has been curtailed at the point of use.

Following this minute of "aging", the dilute polymer solution discharges from the tank 77 via a conduit 79 leading directly to the point of use 61. Associated with the conduit 79 is an automatic sampling device 81 which diverts a small side stream and tests it to determine the percentage by weight of polymer in the dilute aqueous stream. A suitable signal from the sampling device 81 is sent to the overall control system 73. At the aforementioned flow rate of about 3 g.p.m., representative dilutions of between about 0.05% and about 2% by weight percent of polymer may be obtained. Should a lesser concentration of polymer be desired, secondary dilution is employed. The liquid level sensor 78 can be used to promptly detect changes in the consumption of the dilute polymer solution at the point of use 61. In the illustrated embodiment, a simple off-on valve 65 is employed which would be closed at the same time power is removed from the metering pump halting further dispersion until the level within the tank drops. Other means for detecting a change in flow through the conduit 79 can also be used.

Secondary diluent, for example clean or recycled water, from a suitable source 83 is fed through a variable control valve 85, through a suitable flowmeter 87 and through a branch conduit 89 into the main flow of dilute polymer. Inasmuch as the initial dispersion and dilution has already been effected, further dilution is carried out easily, and no specific mixing region is required. The flow rate of secondary diluent through the line 89 is varied slightly by the control system 73 until the automatic sampling device 81 sends a signal that the desired ultimate concentration has been achieved.

Although the illustrated system has been found to be of particular use in the preparation of polymer solutions for employment in the settling of waste water and in the conditioning of sludge, it is considered to have utility in other applications wherein a concentrated fluid polymer, particularly a water-in-oil emulsion, is desired to be dispersed uniformly into a much larger volume stream without degradation of the long chain polymers. Although not limited to the formation of such aqueous dilutions, the invention is expected to find its greatest utility in operations wherein the volume of flow of the diluent through the dispersion device is at least about one hundred times the volume of flow of the polymeric material. Likewise, although the invention is not inherently limited to treatment of water, because the greatest advantage appears to be in forming extremely dilute solutions using large volumes of diluent, it is anticipated that its greatest use will be in treating water or aqueous compositions.

Although the invention has been described with regard to a preferred embodiment which constitutes the best mode presently contemplated by the inventors, it should be understood that other modifications which would be obvious to one having the ordinary skill in this art may be made without departing from the scope of the invention which is defined solely by the claims appended hereto. Various features of the invention are emphasized in the claims which follow.

What is claimed is:

1. A device for dispersing fluid polymeric material in a liquid diluent, which device comprises
    a body providing a generally T-shaped interior cavity having a pair of opposed inlets and a side outlet which is located therebetween,
    a liquid diluent injection assembly in one of said inlets with the front end thereof located in said interior cavity of said body,
    a polymer injection assembly in said other inlet with the front end thereof located in said interior cavity, the juxtaposition of said front ends of said injection assemblies within said interior cavity being such as to create a zone where countercurrently flowing diluent and polymeric material are pre-mixed and also being such as to create an orifice there between wherein the polymeric material is subjected to high shear forces, and
    means for adjusting the relative positions of said injection assemblies within said interior cavity to control diluent flow rate by changing the size of said orifice, whereby the dilute stream exiting from said side outlet contains polymeric material which has been dispersed into the diluent without substantial degradation of the polymer chain length.

2. A device in accordance with claim 1 wherein said polymer injection assembly includes valve means for preventing premature contact between the polymeric material and the diluent prior to discharge from said polymer injection device.

3. A device in accordance with claim 1 wherein said adjusting means includes mating threaded portions for changing the axial location of said polymer injection assembly within said interior cavity.

4. A device in accordance with claim 1 wherein said injection assemblies are aligned substantially coaxially.

5. A device in accordance with claim 4 wherein the front end of said diluent injection assembly terminates in an outwardly flaring nozzle and wherein the front end of said polymer injection assembly terminates in a part having a diameter which is less than the diameter at the front end of said outwardly flaring nozzle.

6. A device in accordance with claim 5 wherein said polymer injection assembly terminal part has a smooth, rounded circumference which forms an annular orifice region between it and the interior surface of said outward flaring nozzle and wherein axial adjustment of said polymer injection assembly changes the thickness of said annular orifice.

7. A device in accordance with claim 5 wherein said front end of said diluent nozzle is located past the centerline of said outlet and wherein a secondary mixing chamber is created in said interior cavity in a region surrounding said terminal part of said polymer injection assembly.

8. A system for the on-line supply of a polymer dispersion to a point of use, which system comprises, a dispersing device in accordance with claim 1, means for supplying a metered amount of polymer to said polymer injection assembly, means for supplying a measured amount of diluent to said diluent injection assembly, a detention tank connected to said dispersion outlet having a size so that said dispersion from said dispersing device has a residence time therein of between about 30 seconds and about 2 minutes, and conduit means for delivering said dispersion from said detention tank to the point of use.

9. A system in accordance with claim 8 wherein control means is provided which includes means for detecting changes in the consumption of the dilute dispersion at said point of use and wherein means is provided and connected to said control means for automatically altering said supply of diluent and polymeric material relative to a change in said consumption.

10. A system in accordance with claim 8 wherein means for supplying secondary diluent is connected to said conduit means, wherein means for sampling and testing the dispersion to determine the amount of polymer therewithin is connected to said conduit means at a location downstream of said secondary diluent connection and wherein overall control means is provided to vary the amount of secondary diluent being supplied pursuant to signals received from said sampling and testing means.

11. A system in accordance with claim 8 wherein a variable metering pump is provided for supplying said polymer and wherein control means is provided for varying the output of said metering pump in response to a varying demand at the point of use with respect to the weight percentage of polymer in said dispersion.

* * * * *